United States Patent
Radovic et al.

(10) Patent No.: US 6,985,984 B2
(45) Date of Patent: Jan. 10, 2006

(54) MULTIPROCESSING SYSTEMS EMPLOYING HIERARCHICAL BACK-OFF LOCKS

(75) Inventors: Zoran Radovic, Uppsala (SE); Erik Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 10/289,822

(22) Filed: Nov. 7, 2002

(65) Prior Publication Data

US 2004/0098723 A1    May 20, 2004

(51) Int. Cl.
*G06F 12/14* (2006.01)

(52) U.S. Cl. .................. 710/200; 711/150; 711/152

(58) Field of Classification Search ............. 709/214, 709/216; 710/200, 240; 711/150, 152, 163

See application file for complete search history.

(56) References Cited

U.S. PATENT DOCUMENTS

| | | | |
|---|---|---|---|
| 6,148,300 A * | 11/2000 | Singhal et al. | 707/8 |
| 6,480,918 B1 * | 11/2002 | McKenney et al. | 710/200 |
| 6,792,497 B1 * | 9/2004 | Gold et al. | 710/317 |
| 2003/0195920 A1 * | 10/2003 | Brenner et al. | 709/107 |

* cited by examiner

*Primary Examiner*—Gary Portka
(74) *Attorney, Agent, or Firm*—Meyertons Hood Kivlin Kowert & Goetzel, P.C.; B. Noël Kivlin (57) ABSTRACT

A multiprocessing system including multiple processing nodes employs various implementations of hierarchical back-off locks. A thread attempting to obtain a software lock may determine whether the lock is currently owned by a different node than the node in which the thread is executing. If the lock is not owned by a different node, the thread executes code to perform a fast spin operation. On the other hand, if the lock is owned by a different node, the thread executes code to perform a slow spin operation. In this manner, node locality may result wherein a thread that is executing within the same node in which a lock has already been obtained will be more likely to subsequently acquire the lock when it is freed in relation to other contending threads executing in other nodes.

38 Claims, 5 Drawing Sheets

MULTIPROCESSING SYSTEMS EMPLOYING HIERARCHICAL BACK-OFF LOCKS

BACKGROUND OF THE INVENTION

1. Field of the Invention

This invention relates to the field of multiprocessor computer systems and, more particularly, to mechanisms and methods for optimizing spin-lock operations within multiprocessor computer systems.

2. Description of the Related Art

A popular architecture in commercial multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming various limitations associated with shared bus architectures. Since many of the processor accesses are completed within a node, nodes typically have much lower bandwidth requirements upon the network in comparison to the bandwidth requirements a shared bus architecture must provide upon its shared bus to attain comparable performance. The nodes may operate at high clock frequency and bandwidth, accessing the network when needed. Additional nodes may be added to the network without affecting the local bandwidth of the nodes. Instead, only the network bandwidth is affected.

Many distributed shared memory architectures have non-uniform access time to the shared memory. Such architectures are known as non-uniform memory architectures (NUMA). Most systems that form NUMA architectures also have the characteristic of a non-uniform communication architecture (NUCA), in which the access time from a processor the other processors' caches varies greatly depending on their placement. In particular, node-based NUMA systems, where a group of processors have a much shorter access time to each other's caches than to the other caches, are common. Recently, technology trends have made it attractive to run more than one thread per chip, using either the chip multiprocessor (CMP) and/or the simultaneous multi-threading (SMT) approach. Large servers, built from several such chips, can therefore be expected to form NUCA architectures, since collated threads will most likely share an on-chip cache at some level.

Due to the popularity of NUMA systems, optimizations directed to such architectures have attracted much attention in the past. For example, optimizations involving the migration and replication of data in NUMA systems have demonstrated a great performance improvement in many applications. In addition, since many of today's applications exhibit a large fraction of cache-to-cache misses, optimizations which consider the NUCA nature of a system may also lead to significant performance enhancements.

One particular problem associated with multiprocessing computer systems having distributed shared memory architectures relates to spin-lock operations. In general, spin-lock operations are associated with software locks which are used by programs to ensure that only one parallel process at a time can access a critical region of memory. A variety of lock implementations have been proposed, ranging from simple spin-locks to advanced queue-based locks. Although simple spin-lock implementations can create very bursty traffic as described below, they are still the most commonly used software lock within computer systems.

Systems employing spin-lock implementations typically require that a given process perform an atomic operation to obtain access to a critical memory region. For example, an atomic test-and-set operation is commonly used. The test-and-set operation is performed to determine whether a lock bit associated with the memory region is cleared and to atomically set the lock bit. That is, the test allows the thread to determine whether the memory region is free of a lock by another thread, and the set operation allows the thread to achieve the lock if the lock bit is cleared. If the test of the lock bit indicates that the memory region is currently locked, the thread initiates a software loop wherein the lock bit is continuously read until the lock bit is detected as cleared, at which time the thread reinitiates the atomic test-and-set operation.

When several spinning processors contend for access to the same memory region, a relatively large number of transaction requests may be generated. Due to this, the latency associated with the release of a lock until the next contender can acquire the lock may be relatively high. The large number of transactions can further limit the maximum frequency at which ownership of the lock can migrate from node to node. Finally, since only one of the spinning processors will achieve the lock, the failed test-and-set operations of the remaining processors result in undesirable requests on the network. The coherency unit in which the lock is stored undesirably migrates from processor to processor and node to node, invalidating other copies. Network traffic is thereby further increased despite the fact that the lock is set.

Other spin-lock implementations have therefore been proposed to improve performance and reduce network traffic when contention for a lock exists. For example, in some implementations, the burst of refill traffic when a lock is released may be reduced by using an exponential back-off delay in which, after failing to obtain a lock, the requester waits for successively longer periods of time before initiating additional lock operations. In other implementations, queue-based locking methodologies have been employed to reduce network traffic. In a system that implements a queue-based lock, requesting processors contending for a lock are queued in an order. A contending processor generates transactions to acquire the lock only if it is the next in line contender. Numerous variations of queue-based lock implementations are known.

While the various optimizations for spin-lock implementations have in some instances led to enhanced performance, most solutions do not consider or exploit the NUCA characteristics of a distributed shared memory computer system. In addition, many implementations have resulted in relatively high latencies for uncontended locks. A mechanism is therefore desirable that may exploit the NUCA nature of a multiprocessing system to optimize spin-lock operations without introducing significant latencies for uncontended locks.

SUMMARY OF THE INVENTION

A multiprocessing system including multiple processing nodes is provided that employs various implementations of hierarchical back-off locks. In one embodiment, a thread attempting to obtain a software lock may determine whether the lock is currently owned by a different node than the node in which the thread is executing. If the lock is not owned by a different node, the thread executes code to perform a fast spin operation. On the other hand, if the lock is owned by a different node, the thread executes code to perform a slow spin operation. In this manner, node locality may result wherein a thread that is executing within the same node in which a lock has already been obtained will be more likely to subsequently acquire the lock when it is freed in relation to other contending threads executing in other nodes. Decreased migration of the lock (and the data the lock is protecting) from node to node may thus result and overall performance may be enhanced. In various embodiments, global throttling operations as well as starvation avoidance functionality may additionally be employed.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
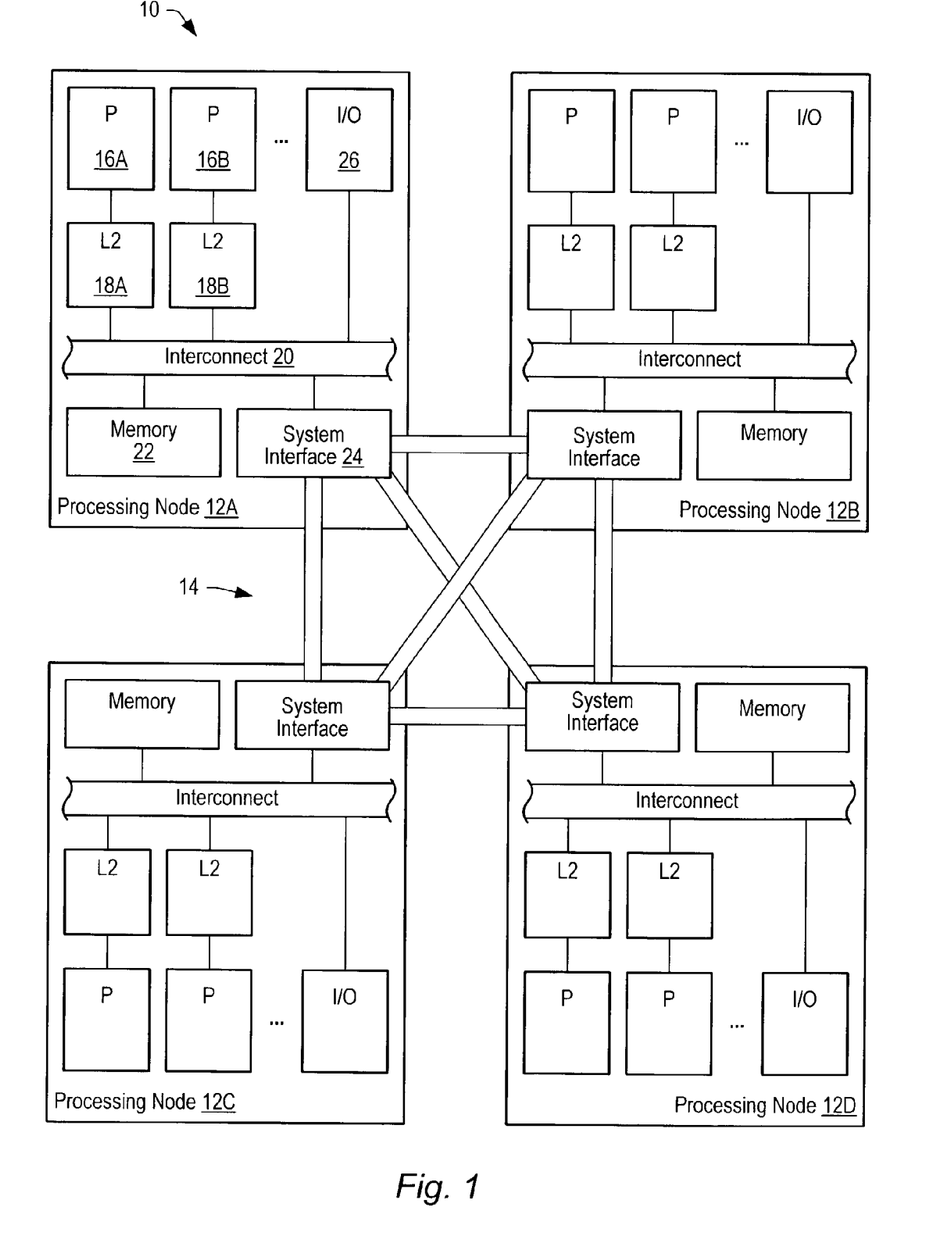
FIG. 1 is a block diagram of one embodiment of a multiprocessing computer system 10.

Turning now to FIG. 1, a block diagram of one embodiment of a multiprocessing computer system 10 is shown. Computer system 10 includes multiple processing nodes 12A–12D interconnected by a point-to-point network 14. Elements referred to herein with a particular reference number followed by a letter will be collectively referred to by the reference number alone. For example, processing nodes 12A–12D will be collectively referred to as processing nodes 12. In the embodiment shown, each processing node 12 includes multiple processors, caches, a memory, and a system interface. For example, processing node 12A is configured with multiple processors including processors 16A–16B. The processors 16 are connected to caches 18, which are further coupled to a node interconnect 20. Additionally, a memory 22 and a system interface 24 are coupled to node interconnect 20. Still further, one or more input/output (I/O) interfaces 26 may be coupled to node interconnect 20. I/O interfaces 26 are used to interface to peripheral devices such as serial and parallel ports, disk drives, modems, printers, etc. Other processing nodes 12B–12D may be configured similarly.

Each processing node 12 is a processing node having memory 22 as the shared memory. Processors 16 are high performance processors. In one embodiment, each processor 16 may employ an ultraSPARC™ processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18. It is noted that in some embodiments, the processors 16 and caches 18 of a node may be incorporated together on a single integrated circuit in a chip multiprocessor (CMP) configuration.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A processor within a different node than the home node may access the data at an address of the home node, potentially caching the data.

Therefore, coherency is maintained between processing nodes 12 as well as among processors 16 and caches 18 within a particular processing node 12A–12D. System interface 24 provides internode coherency, and may further perform snooping or other functionality on interconnect 20 to provide intranode coherency.

In various embodiments, data stored in a particular cache, such as cache 18A, may be accessed and used to service requests by other processors (e.g., processor 16B). In addition or alternatively, in various embodiments, portions of memory 22 may be allocated to cache data that is mapped to other nodes (i.e., data having remote home nodes). In this manner, data accessed by a processor 16 may be cached in an allocated location of the memory 22 of that node to allow quicker subsequent accesses to the data.

In addition to maintaining internode coherency, system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

It is noted that the system of FIG. 1 forms a NUMA architecture, in that the latency of accesses to shared memory 22 is dependent upon the particular node in which an initiating processor resides. The system of FIG. 1 also forms a NUCA architecture, in that the access time from a processor to other processor's caches may vary greatly depending upon the placement.

As will be described in further detail below, computer system 10 may be configured to perform optimized spin-lock operations. More particularly, code executing on processors 16 may be configured such that lock implementations result in a higher probability that contended locks will be handed over to threads executing within the same node. In view of the non-uniform nature of the communication architecture, improved performance may thus be attained by reducing network traffic and migration of the lock (as well as the data the lock is protecting) from node to node. Additional enhancements may further be implemented to avoid starvation.

Figure 2:
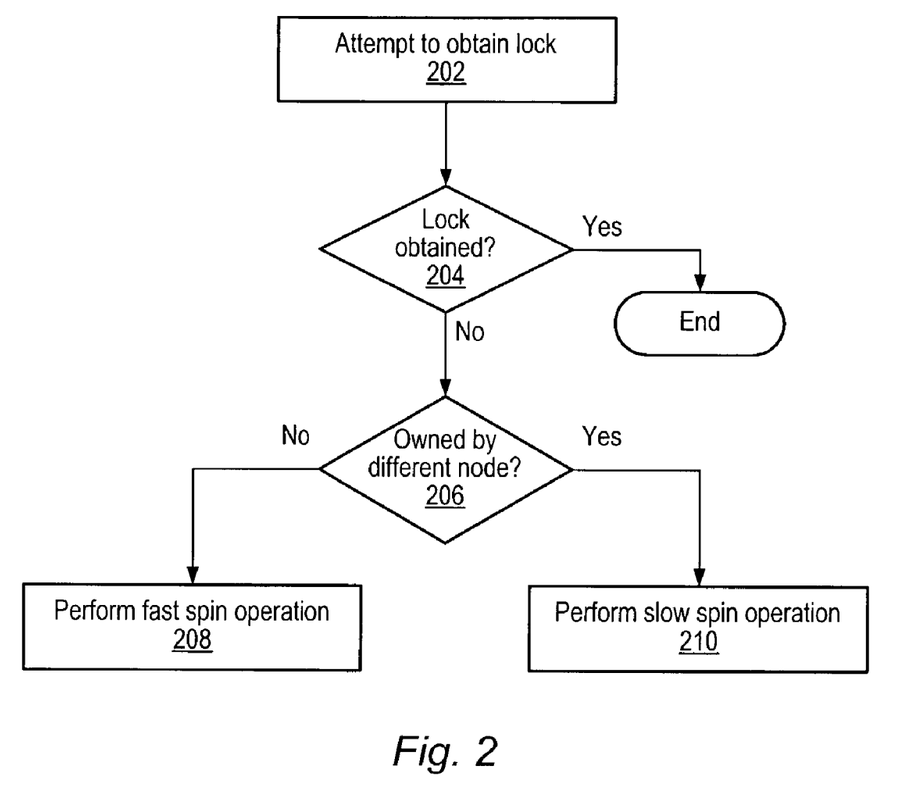
FIG. 2 is a flow diagram depicting operations associated with a spin lock implementation.

FIG. 2 is a flow diagram depicting operations associated with one embodiment of a spin-lock implementation. It is noted that the depicted operations may be performed in response to software instructions executable by processors 16 and stored, for example, in memory 22. It is also noted that differing threads executing within computer system 10 may independently perform the depicted functionality simultaneously when lock contention occurs.

As shown in FIG. 2, a thread executing on a given processor 16 may attempt to obtain a software lock in step 202. If the lock is obtained in step 204, the routine ends, and operations rendered permissible as a result of lock acquisition may be performed, as desired. On the other hand, if the lock is not obtained in step 204, it is determined whether the lock is currently owned by a different node in step 206. If the lock is not owned by a different node, the thread executes code to perform a fast spin operation in step 208. On the other hand, if the lock is owned by a different node, the thread executes code to perform a slow spin operation in step 210. In this manner, node locality may result wherein a thread executing within the same node in which a lock has been obtained will be more likely to subsequently acquire the lock when it is freed in relation to other contending threads executing in other nodes. Decreased migration of the lock from node to node may thus result and overall performance may be enhanced.

The fast spin operation performed during step 208 may be implemented in a variety of ways. For example, as detailed below, the fast spin operation may include execution of a software loop that repeatedly attempts to gain ownership of the lock with a relatively fast initial repetition rate. The slow spin operation performed during step 210 may be similar, however, with a relatively slower initial repetition rate.

Figure 3:
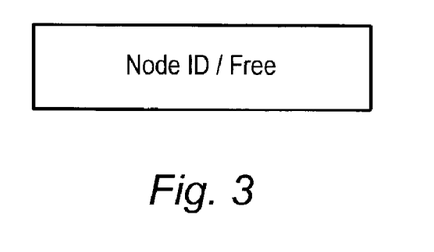
FIG. 3 illustrates fields stored with a software lock.

In addition, the manner in which the current owner of the lock is determined in step 206 may be implemented in a variety of ways. For example, as depicted in FIG. 3, a software lock may be associated with a shared memory location that contains a field to store the node id of an owning node. If the lock is not owned, a "free" indication may be stored in the shared memory location. The node id and free state indications may be provided as separately encoded fields, or may be combined into a common encoded field. When a thread acquires the lock, the node id of the processing node in which the thread is executing is stored in the shared memory location.

Figure 4:
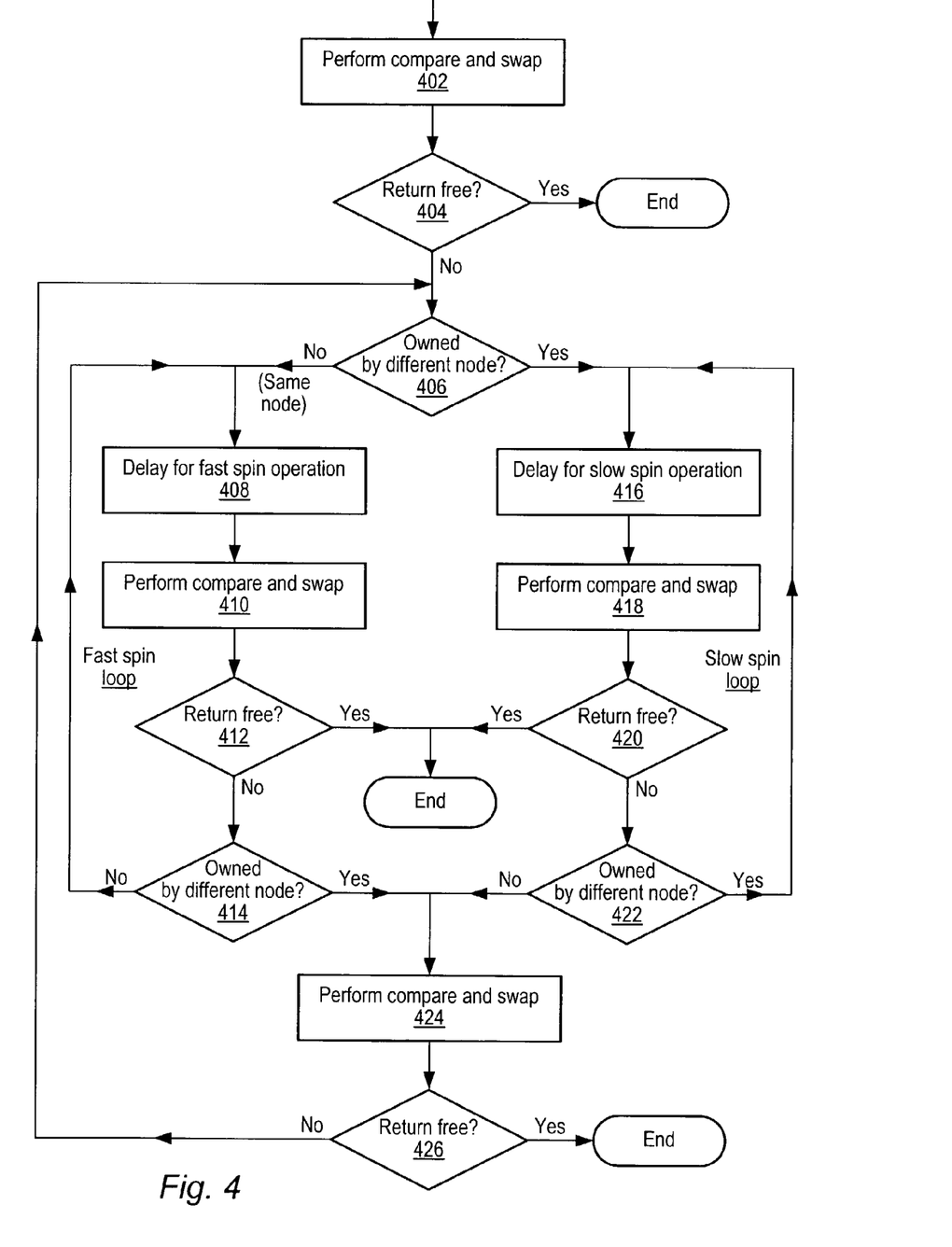
FIG. 4 is flow diagram illustrating a specific spin lock implementation.

FIG. 4 is a flow diagram illustrating a specific spin lock implementation that conforms generally to the functionality of FIG. 2. In step 402, a compare and swap (CAS) operation may be performed to attempt to gain the lock. The CAS (address, expected value, new value) instruction atomically checks the contents of a memory location address to see if it matches an expected value and, if so, replaces it with a new value. It is noted that in other implementations, other specific instructions may be utilized to determine whether the lock is free and to obtain the lock, as well as to determine the node id of the current owner of the lock. For example, in other implementations, a TAS (address) operation which atomically writes a non-zero value to the address memory location and returns its original contents, where a non-zero value for the lock represents a lock condition and a zero value means the lock is free, may be utilized. Alternatively, a swap (address, value) operation which atomically writes a value to the address memory location and returns its original contents may be utilized. Still other implementations may employ other atomic memory primitive operations and/or non-atomic memory primitive operations (e.g., load-linked (or load-locked), store-conditional operations) to obtain a lock and/or determine the node id of an owner of the lock.

In step 404, if the compare and swap operations returns a free indication in step 404, the lock has been obtained and the routine ends. It is noted that the lock at this point will store the node id of the thread that obtained the lock. When the thread releases the lock, a free indication will again be stored in the lock.

If the result of the compare and swap operation instead indicates that the lock is currently owned, subsequent operations depend upon whether the lock is owned by the same node or a different node (step 406). If the lock is owned by the same node, a software loop referred to as the "fast spin loop" is entered wherein a delay associated with the loop is introduced to provide a relatively small initial loop delay (step 408). Another compare and swap operation is subsequently performed in step 410. The loop delay provided in step 408 and compare and swap operation performed in step 410 are iteratively repeated for as long as the lock is not acquired and remains owned by the same node (steps 412 and 414).

In one embodiment, the delay introduced in step 408 may exponentially increase (e.g., with a capped delay value) during successive iterations of the fast spin loop, as desired.

This may result in improved spin lock performance. In other embodiments, the delay introduced in step 408 may vary over time in other specific ways.

If in step 406 it is determined the lock is owned by a different node, a software loop referred to as the "slow spin loop" is entered wherein a relatively long delay is provided (step 416). In step 418, a compare and swap operation may be performed to attempt acquisition of the lock. Similar to operations in the fast spin loop, steps 416 and 418 are iteratively repeated until the lock is either acquired or becomes owned by the same node (steps 420 and 422). Like the foregoing, the delay provided in step 416 may vary over successive iterations. For example, the delay introduced in step 416 may increase exponentially, as desired. The overall delay provided in step 416 upon a number of initial iterations of the slow spin loop is, however, longer than the overall delay provided in step 408 for the same number of initial iterations of the fast spin loop.

As depicted in steps 414 and 424, if the lock is obtained by a different node while the code is executing in the fast spin loop, another compare and swap operation is performed, and, if the lock is not acquired, operations return to step 406. Similarly, if the lock is acquired by the same node (step 422) while the code is executing in the slow spin loop, a compare and swap operation is performed in step 424. If the lock is not acquired, operation returns to step 406.

It is noted that when multiple processors in different nodes of computer system 10 execute code according to the spin lock operations depicted in FIG. 4, the processors that spin in the node that currently owns the lock may have a greater likelihood of acquiring the lock. As a result, the frequency of migration of the lock from node to node may be reduced, and overall improved performance may be attained.

The following code sequence may be used to implement one embodiment of the operations depicted in FIG. 4.

```
typedef volatile unsigned long hbo_lock;

1:  void hbo_acquire (hbo_lock *L)
2:  {
3:      // try to lock the global lock with an
4:      // atomic compare_and_swap operation
5:      tmp = cas(L, FREE, my_node_id);
6:      // lock was free, and is now locked */
7:      if (tmp == FREE)
8:          return;
9:      hbo_acquire_slowpath(L);
10: }

11: void backoff(int *b, int backoff_cap)
12: {
13:     int i;
14:     for (i = *b; i; i--); // delay
15:     *b = min(*b * BACKOFF_FACTOR, backoff_cap);
16: }

17: void hbo_acquire_slowpath(hbo_lock *L)
18: {
19:     int b;
20:
21: start:
22:
23:     if (tmp == my_node_id) {
24:         b = BACKOFF_BASE;
25:         while (1) {
26:             // exponential backoff for the local lock
27:             backoff(&b, BACKOFF_CAP);
28:             tmp = cas(L, FREE, my_node_id);
29:             if (tmp == FREE)
30:                 return;
31:             // lock moved to the other node!
32:             if (tmp != my_node_id) {
33:                 backoff(&b, BACKOFF_CAP);
34:                 goto restart;
35:             }
36:         }
37: }
38:     else {              // tmp != my_node_id
39:         b = REMOTE_BACKOFF_BASE;
40:         while (1) {
41:             backoff(&b, REMOTE_BACKOFF_CAP);
42:             tmp = cas(L, FREE, my_node_id);
43:             if (tmp == FREE)
44:                 return;
45:             // lock is back in our node!
46:             if (tmp == my_node_id)
47:                 goto restart;
48:             }
49:         }
50:
51: restart:
52:
53:         tmp = cas(L, FREE, my_node_id);
54:         if (tmp == FREE)
55:             return
56:         goto start;
57: }

58: void hbo_release(hbo_lock *L)
59: {
60:     *L = FREE;
61: }
```

Figure 5:
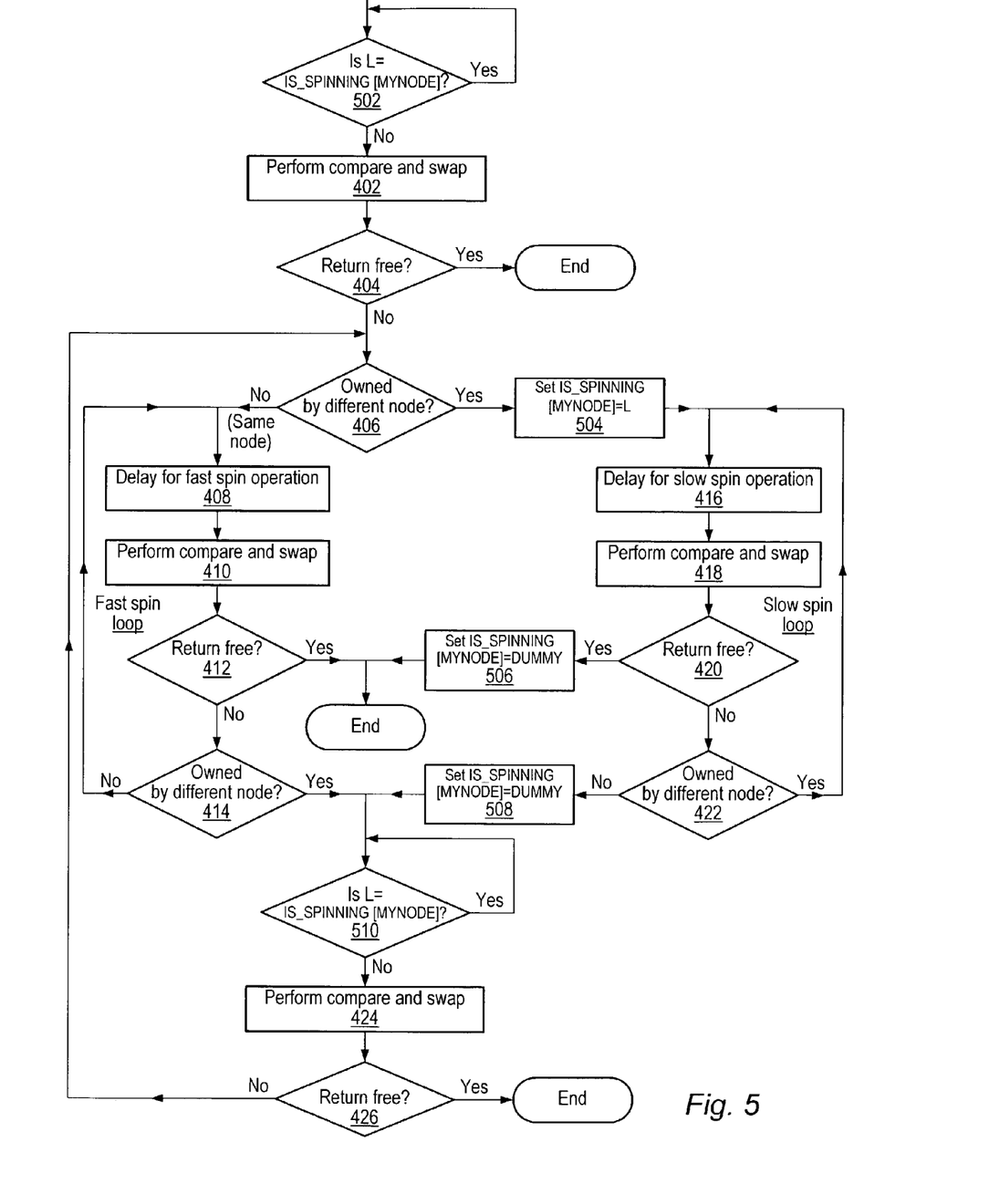
FIG. 5 is a flow diagram illustrating another spin lock implementation including global throttling.

When multiple processors within the same node are executing in the slow spin loop, it is noted that global coherence traffic through network 14 may result due to the lock acquisition activities (e.g., CAS operations) of each of the spinning processors. Accordingly, FIG. 5 illustrates further operations which may be performed to implement global throttling. As will be described in further detail below, the global throttling operations depicted in FIG. 5 function to limit the number of processors spinning in the slow spin loop (i.e., the number of processors in the same node that attempt to gain a lock that is currently owned by another node), thereby reducing global traffic on network 14.

As depicted in FIG. 5, each node may be assigned a local variable IS_SPINNING[MY_NODE_ID]. The IS_SPINNING[MY_NODE_ID] variable is maintained on a per-node basis (i.e., a separate variable is maintained for each node). The IS_SPINNING[MY_NODE_ID] variable contains a value indicating whether another processor within the same node is currently spinning in the slow spin loop in relation to the same lock address. In step 502, if IS_SPINNING[MY_NODE_ID] is equal to the lock address the thread is trying to acquire, the executing processor may spin on step 502, thus preventing the thread from performing transactions directed to the lock address. The effect of this operation will be better understood from the description below.

If IS_SPINNING[MY_NODE_ID] is not equal to the address of the lock the thread is trying to acquire, subsequent functionality is performed in a manner similar to that of FIG. 4. Operations that correspond to those of FIG. 4 are numbered identically.

As shown in step 504, however, if the lock the thread is trying to acquire is owned by a different node, the thread sets IS_SPINNING[MY_NODE_ID] equal to L, the lock address. This operation may thus prevent other threads executing in the same node from executing beyond step 502, thus inhibiting them from performing lock acquisition transactions to the lock address (e.g., the compare and swap operations of steps 402 and 418) that might otherwise create global coherence traffic on network 14.

In the implementation of FIG. 5, the IS_SPINNING variable for a node having a processor executing in the slow spin mode is not changed until the thread exits the slow spin loop. If the thread obtains the lock, the IS_SPINNING [MY_NODE_ID] variable is changed to a different value (in this example, referred to as "DUMMY") in step 506. In addition, if the thread exits the slow spin loop is step 422 (due to the node acquiring the lock), the IS_SPINNING [MY_NODE_ID] variable is similarly changed to a different value (again, in this example, referred to as "DUMMY") in step 508. By changing the IS_SPINNING [MY_NODE_ID] variable in step 506 or 508, another thread executing within the same node on step 502 may be released, thus allowing it to perform the subsequent lock acquisition functionality as depicted.

In step 510, the thread determines whether the IS_SPINNING[MY_NODE_ID] variable is equal to the lock address the thread is trying to acquire. Similar to step 502, if the IS_SPINNING[MY_NODE_] variable is equal to the lock address, the thread will not perform the further lock acquisition functionality of steps 424, etc. until the IS_SPINNING[MY_NODE_ID] variable is changed by a processor executing in the slow spin loop.

The following code sequence may be used to implement one embodiment of the operations depicted in FIG. 5.

```
typedef volatile unsigned long hbo_lock;
-------------------------------------------------------------------
1:  void hbo_acquire (hbo_lock *L)
2:  {
3:      unsigned long tmp;
4:
5:      while (L == is_spinning[my_node_id]) ; // spin
6:      tmp = cas(L, FREE, my_node_id);
7:      if (tmp == FREE)
8:          return; // lock was free, and is now locked
9:      hbo_acquire_slowpath(L, tmp);
10: }
-------------------------------------------------------------------
11. void backoff(int *b, int cap)
12. {
13.     int i;
14.     for (i = *b; i; i--); // delay
15.     *b = min(*b * BACKOFF_FACTOR, cap);
16. }
-------------------------------------------------------------------
17: void hbo_acquire_slowpath (hbo_lock *L,
18:                            unsigned long tmp)
19: {
20:     int b;
21:
22. start:
23.
24.     if (tmp == my_node_id) {       // local lock
25.         b = BACKOFF_BASE;
26.         while (1) {
27.             backoff (&b, BACKOFF_CAP);
28.             tmp = cas(L, FREE, my_node_id);
29.             if (tmp == FREE)
30.                 return;
31.             if (tmp ! = my_node_id) {
32.                 backoff(&b, BACKOFF_CAP);
33.                 goto restart;
34.             }
35.         }
36.     }
37.     else {                          // remote lock
38.         b = REMOTE_BACKOFF_BASE;
39.         is_spinning[my_node_id] = L;
40.         while (1) {
41.             backoff(&b, REMOTE_BACKOFF_CAP);
42.             tmp = cas(L, FREE, my_node_id);
43.             if (tmp == FREE) {
44.                 is_spinning[my_node_id] =DUMMY;
45.                 return;
46.             }
47.             if (tmp == my_node_id) {
48.                 is_spinning[my_node_id] =DUMMY;
49.                 goto restart;
50.             }
51.         }
52.     }
53.
54.     restart:
55.
56.         while (L == is_spinning[my_node_id]); // spin
57.         tmp = cas(L, FREE, my_node_id);
58.         if (tmp == FREE)
59.             return;
60.     goto start;
61: }
-------------------------------------------------------------------
62: void hbo_release(hbo_lock *L)
63: {
64.     *L = FREE;
65. }
```

It is noted that the manner in which a thread inhibits other threads executing within the same node from performing lock acquisition transactions when executing in the slow spin loop may vary in other embodiments. For example, in alternative embodiments, other predetermined values rather than the lock address L may be stored in a local variable.

Figure 6:
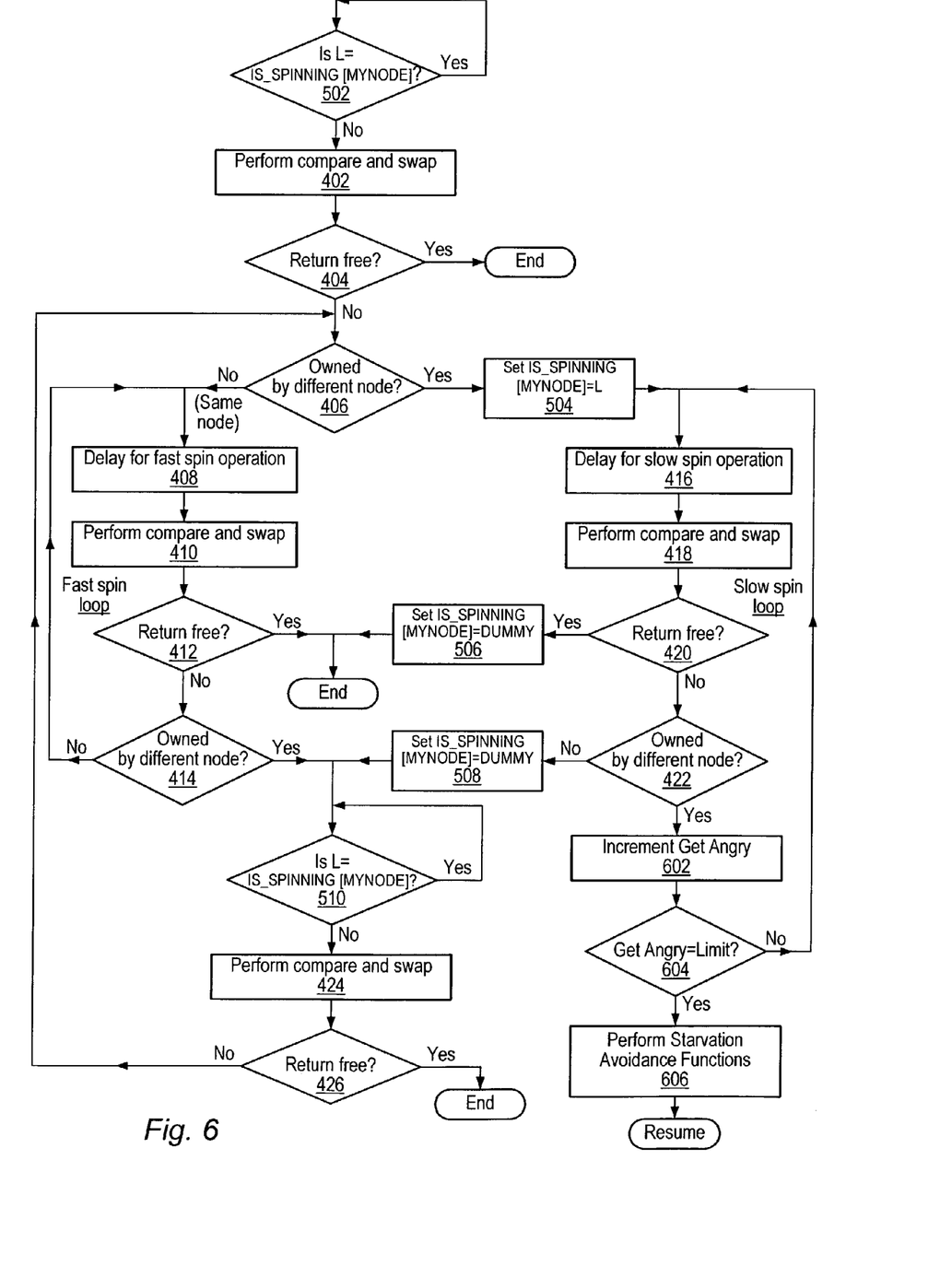
FIG. 6 is a flow diagram illustrating another spin lock implementation including starvation avoidance functions.

In yet a further embodiment, additional operations may be performed to avoid starvation which could otherwise result if a processor spins in the slow spin loop for an excessive number of iterations. For example, as depicted in FIG. 6, steps 602 and 604 may be added to the slow spin loop to continuously increment a "get_angry" variable. When the get_angry variable reaches a predetermined limit, various starvation avoidance functions may be performed (step 606). For instance, during step 606, the thread may initiate a fast spin loop to spin very quickly on the lock (e.g., quickly perform repetitive CAS operations until the lock is obtained). In addition, the thread may additionally set the IS_SPINNING variables of other nodes to L, the lock address, to cause any contending threads executing in other nodes to get trapped in step 502. Still further, the thread may additionally change the IS_SPINNING[MY_NODE_ID] variable for its node to the DUMMY value to thereby cause all of the other contending threads in the same node to spin quickly on the lock. Implementation of one or more of these starvation avoidance functions may advantageously result in the thread acquiring the lock quickly. After the thread acquires the lock in step 606, the thread may be required to release the threads of other nodes which may be trapped in step 502 by resetting their respective IS_SPINNING variables to the DUMMY value.

In addition to the "thread-centric" starvation techniques described above, other starvation avoidance techniques may further be employed such as reactive synchronization. Still further, in one embodiment a "node-centric" technique may be employed to avoid node starvation. In particular, in one embodiment, the code may be configured such that after a thread (or a small number of threads) has tried several times to acquire a remote lock owned by another node, the thread gets "angry", in a manner as described above. An angry node may take the following measures to get the lock more quickly; (1) it will spin more frequently, and (2) it will set the IS_SPINNING variables for the other nodes to the lock address and thus prevent more threads in those nodes from trying to acquire the lock.

The following code sequence may be used to implement one embodiment that employs some of the starvation avoidance functions described above.

```
typedef volatile unsigned long hbo_lock;
```
---
```
1:    void hbo_acquire (hbo_lock *L)
2:    {
3:        unsigned long tmp;
4:
5:        while (L == is_spinning[my_node_id]) ; // spin
6:        tmp = cas(L, FREE, my_node_id);
7:        if (tmp == FREE)
8:            return; // lock was free, and is now locked
9:    hbo_acquire_slowpath(L, tmp);
10:   }
```
---
```
11.   void backoff(int *b, int cap)
12.   {
13.       int i;
14.       for (i = *b; i; i--) ; // delay
15.       *b = min(*b * BACKOFF_FACTOR, cap);
16.   }
```
---
```
17:   void hbo_acquire_slowpath (hbo_lock *L,
18:                              unsigned long tmp)
19:   {
20:       int b;
21.
22.   start:
23.
24.       if (tmp == my_node_id) {    // local lock
25.           b = BACKOFF_BASE;
26.           while (1) {
27.               backoff (&b, BACKOFF_CAP);
28:              tmp = cas(L, FREE, my_node_id);
29:              if (tmp == FREE)
30:                  return;
31:              if (tmp ! = my_node_id) {
32:                  backoff(&b, BACKOFF_CAP);
33:                  goto restart;
34.              }
35.          }
36.   }
37.   else {              // remote lock
38.       b = REMOTE_BACKOFF_BASE;
39.       is_spinning[my_node_id] = L;
40:       while (1) {
41:           backoff(&b, REMOTE_BACKOFF_CAP);
42:           tmp = cas(L, FREE, my_node_id);
43:           if (tmp == FREE) {
44.               // release the threads from our node
45:               is_spinning[my_node_id] =DUMMY;
46.               // release the threads from stopped nodes, if any
47:               if (stopped nodes > 0)
48:                   is_spinning[for each stopped_node] = DUMMY;
49:                   return;
50:           }
51:           if (tmp == my_node_id) {
52:               is_spinning[my_node_id] =DUMMY;
53:               if (stopped_nodes > 0)
54:                   is_spinning[for each stopped_node] =DUMMY;
55:                   goto restart;
56.           }
57:           if (tmp != my_node_id) {
58.               // lock is still in some remode node
59.               get_angry++;
60                if (get_angry == GET_ANGRY_LIMIT) {
61.                   stopped_node_id[stopped_nodes++] = tmp;
62.                   is_spinning[tmp] = L;
63.               }
64.           }
65.   }
66.
67:         restart:
```
-continued
```
68.
69:          while (L == is_spinning[my_node_id]) ; // spin
70:          tmp = cas(L, FREE, my_node_id);
71:          if (tmp == FREE)
72:              return;
73:      goto start;
74:   }
```
---
```
75:   void hbo_release(hbo_lock *L)
76.   {
77.       *L = FREE;
78.   }
```

It is noted that the initialization of various variables, such as get_angry and stopped_nodes is excluded in the above illustrative embodiment.

Various embodiments may further include receiving, sending or storing instructions and/or data that implement the spin lock implementations of any of FIGS. 2–6 upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing spin-lock operations in a computer system comprising:
    a first thread determining a node id of an owner of a software lock;
    the first thread spinning on the software lock at a first initial rate in response to determining the node id identifies the same node in which the first thread is executing; and
    the first thread spinning on the software lock at a slower initial rate in response to determining the node id identifies a different node than the node in which the first thread is executing.

2. The method as recited in claim 1 further comprising a second thread storing said node id within a storage location associated with said software lock, wherein said node id corresponds to a particular node in which said second thread is executing.

3. The method as recited in claim 2 further comprising the second thread acquiring said software lock upon a determination that the software lock is in a free state and storing said node id within said storage location.

4. The method as recited in claim 2 wherein said first thread is executed by a first processor, and wherein said second thread is executed by a second processor.

5. The method as recited in claim 4 wherein the second processor executes a compare and swap instruction to cause said storage of said node id within said storage location.

6. The method as recited in claim 5 wherein said first processor executes a compare and swap instruction in a software loop while spinning on the software lock.

7. The method as recited in claim 1 further comprising said first thread setting a local variable with a predetermined value in response to determining the node id identifies that the software lock is owned by a different node than the node in which said first thread is executing.

8. The method as recited in claim 7 wherein setting the local variable prevents other threads executing within the same node as the first thread from spinning on said software lock.

9. The method as recited in claim 8 further comprising the first thread changing the local variable to a different value in response to obtaining said software lock.

10. The method as recited in claim 9 wherein changing the local variable results in a third thread executing within the same node as the first thread to begin spinning on the software lock.

11. The method as recited in claim 1 further comprising:
   determining whether the first thread has spun on the software lock at said slower initial rate for a predetermined limit; and
   if the first thread has spun on the software lock for said predetermined limit, said first thread performing a fast spin operation to acquire said software lock that is faster than said slower initial rate.

12. The method as recited in claim 11 further comprising the first thread performing an operation to prevent threads in other nodes from initiating lock acquisition requests to the software lock.

13. A multiprocessing computer system comprising:
   a plurality of nodes including a plurality of processors; and
   a storage medium including instructions executable by one or more of the plurality of processors to implement a method of performing spin-lock operations in a computer system comprising:
      a first thread determining a node id of an owner of a software lock;
      the first thread spinning on the software lock at a first initial rate in response to determining the node id identifies the same node in which the first thread is executing; and
      the first thread spinning on the software lock at a slower initial rate in response to determining the node id identifies a different node than the node in which the first thread is executing.

14. The multiprocessing computer system as recited in claim 13 wherein the method further comprises a second thread storing said node id within a storage location associated with said software lock, wherein said node id corresponds to a particular node in which said second thread is executing.

15. The multiprocessing computer system as recited in claim 14 wherein the method further comprises the second thread acquiring said software lock upon a determination that the software lock is in a free state and storing said node id within said storage location.

16. The multiprocessing computer system as recited in claim 14 wherein said first thread is executed by a first processor, and wherein said second thread is executed by a second processor.

17. The multiprocessing computer system as recited in claim 16 wherein the method further comprises the second processor executing a compare and swap instruction to cause said storage of said node id within said storage location.

18. The multiprocessing computer system as recited in claim 17 wherein the method further comprises said first processor executing a compare and swap instruction in a software loop while spinning on the software lock.

19. The multiprocessing computer system as recited in claim 13 wherein the method further comprises said first thread setting a local variable with a predetermined value in response to determining the node id identifies that the software lock is owned by a different node than the node in which said first thread is executing.

20. The multiprocessing computer system as recited in claim 19 wherein setting the local variable prevents other threads executing within the same node as the first thread from spinning on said software lock.

21. The multiprocessing computer system as recited in claim 20 wherein the method further comprises the first thread changing the local variable to a different value in response to obtaining said software lock.

22. The multiprocessing computer system as recited in claim 21 wherein changing the local variable results in a third thread executing within the same node as the first thread to begin spinning on the software lock.

23. The multiprocessing computer system as recited in claim 13 wherein the method further comprises:
   determining whether the first thread has spun on the software lock at said slower initial rate for a predetermined limit; and
   if the first thread has spun on the software lock for said predetermined limit, said first thread performing a fast spin operation to acquire said software lock that is faster than said slower initial rate.

24. The multiprocessing computer system as recited in claim 23 wherein the method further comprises the first thread performing an operation to prevent threads in other nodes from initiating lock acquisition requests to the software lock.

25. The multiprocessing computer system as recited in claim 13 wherein the plurality of nodes form a non-uniform memory architecture.

26. The multiprocessing computer system as recited in claim 25 wherein each of the plurality of nodes includes at least one cache memory forming a non-uniform communication architecture.

27. A computer readable medium including program instructions executable to implement a method of performing spin-lock operations in a computer system comprising:
   a first thread determining a node id of an owner of a software lock;
   the first thread spinning on the software lock at a first initial rate in response to determining the node id identifies the same node in which the first thread is executing; and
   the first thread spinning on the software lock at a slower initial rate in response to determining the node id identifies a different node than the node in which the first thread is executing.

28. The computer readable medium as recited in claim 27 wherein the method further comprises a second thread storing said node id within a storage location associated with said software lock, wherein said node id corresponds to a particular node in which said second thread is executing.

29. The computer readable medium as recited in claim 28 wherein the method further comprises the second thread acquiring said software lock upon a determination that the software lock is in a free state and storing said node id within said storage location.

30. The computer readable medium as recited in claim 28 wherein said first thread is executed by a first processor, and wherein said second thread is executed by a second processor.

31. The computer readable medium as recited in claim 30 wherein the method further comprises the second processor executing a compare and swap instruction to cause said storage of said node id within said storage location.

32. The computer readable medium as recited in claim 31 wherein the method further comprises said first processor executing a compare and swap instruction in a software loop while spinning on the software lock.

33. The computer readable medium as recited in claim 27 wherein the method further comprises said first thread setting a local variable with a predetermined value in response to determining the node id identifies that the software lock is owned by a different node than the node in which said first thread is executing.

34. The computer readable medium as recited in claim 33 wherein setting the local variable prevents other threads executing within the same node as the first thread from spinning on said software lock.

35. The computer readable medium as recited in claim 34 wherein the method further comprises the first thread changing the local variable to a different value in response to obtaining said software lock.

36. The computer readable medium as recited in claim 35 wherein changing the local variable results in a third thread executing within the same node as the first thread to begin spinning on the software lock.

37. The computer readable medium as recited in claim 27 wherein the method further comprises:
   determining whether the first thread has spun on the software lock at said slower initial rate for a predetermined limit; and
   if the first thread has spun on the software lock for said predetermined limit, said first thread performing a fast spin operation to acquire said software lock that is faster than said slower initial rate.

38. The computer readable medium as recited in claim 37 wherein the method further comprises the first thread performing an operation to prevent threads in other nodes from initiating lock acquisition requests to the software lock.

* * * * *